(12) United States Patent
Giaconi et al.

(10) Patent No.: US 10,331,835 B2
(45) Date of Patent: Jun. 25, 2019

(54) ASIC DESIGN METHODOLOGY FOR CONVERTING RTL HDL TO A LIGHT NETLIST

(71) Applicant: CHRONOS TECH LLC, San Diego, CA (US)

(72) Inventors: Stefano Giaconi, San Diego, CA (US); Giacomo Rinaldi, San Diego, CA (US); Matheus Trevisan Moreira, San Diego, CA (US); Matthew Pryor, San Diego, CA (US); David Fong, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 0 days.

(21) Appl. No.: 15/644,696

(22) Filed: Jul. 7, 2017

(65) Prior Publication Data

US 2018/0011951 A1    Jan. 11, 2018

Related U.S. Application Data

(60) Provisional application No. 62/360,226, filed on Jul. 8, 2016.

(51) Int. Cl.
*G06F 17/50* (2006.01)

(52) U.S. Cl.
CPC .......... *G06F 17/505* (2013.01); *G06F 17/504* (2013.01); *G06F 17/5031* (2013.01); *G06F 17/5054* (2013.01); *G06F 2217/06* (2013.01)

(58) Field of Classification Search
USPC ........................................................ 716/113
See application file for complete search history.

(56) References Cited

U.S. PATENT DOCUMENTS

| | | | |
|---|---|---|---|
| 4,189,625 A | 2/1980 | Strandberg | |
| 8,365,113 B1 * | 1/2013 | Bhardwaj | G06F 17/505 716/104 |
| 9,977,852 B2 | 5/2018 | Giaconi et al. | |
| 9,977,853 B2 | 5/2018 | Giaconi et al. | |
| 2003/0035496 A1 | 2/2003 | Noda | |
| 2004/0151209 A1 | 8/2004 | Cummings | |
| 2005/0180514 A1 | 8/2005 | Choi et al. | |
| 2005/0200388 A1 | 9/2005 | Har et al. | |
| 2008/0285743 A1 | 11/2008 | Yokota et al. | |
| 2008/0304430 A1 | 12/2008 | Zhuyan | |
| 2009/0106719 A1 | 4/2009 | Stevens | |
| 2010/0285743 A1 | 11/2010 | Li et al. | |
| 2016/0188522 A1 | 6/2016 | Hilgemberg Pontes et al. | |
| 2017/0091130 A1 | 3/2017 | Matsunaga | |
| 2017/0308721 A1 | 10/2017 | Pedersen | |
| 2018/0109415 A1 | 4/2018 | Han et al. | |

* cited by examiner

*Primary Examiner* — Eric D Lee
(74) *Attorney, Agent, or Firm* — Procopio, Cory, Hargreaves & S; Mark W. Catanese; Noel C. Gillespie

(57) ABSTRACT

This application discloses the implementation of a self-timed IP with optional clock-less compression and decompression at the boundaries. It also discloses system and methods for application specific integrated circuits to convert RTL code and timing constraints to self-timed circuitry with optional clock-less compression and decompression at the boundaries.

5 Claims, 9 Drawing Sheets

ASIC DESIGN METHODOLOGY FOR CONVERTING RTL HDL TO A LIGHT NETLIST

RELATED APPLICATION INFORMATION

This present application claims the benefit of priority under 35 U.S.C. 119(e) to Provisional Patent Application Ser. No. 62/360,226 filed on Jul. 8, 2016. This application is also related to Published patent application Ser. No. 15/344, 416 titled: "Application Specific Integrated Circuit Interconnect"; and published patent application Ser. No. 15/344,420 titled: "Application Specific Integrated Circuit Link". Published patent application Ser. No. 15/344,441 titled: "System and Method for Application Specific Integrated Circuit Design". All of the above are incorporated herein in their entirety as if set forth in full.

BACKGROUND

1. Technical Field

The various embodiments described herein are related to Application Specific Integrated Circuits (ASICs), and more particularly to the design of various ASICs.

2. Related Art

Contemporary digital ASIC designs are usually based on a synchronous paradigm. They rely on the availability of a periodic global control signal, typically called clock, that controls the sequential logic of an ASIC. In this way, time is perceived as a discrete variable governed by the clock signal therefor sequencing and control of events happen only on predictive points in time. Such discretization of time enables designers to ignore wire and gate delays while designing a digital ASIC; provided that a few timing constraints related to the clock signal are fulfilled. Such simplification is one of the key reasons behind the popularity of the synchronous paradigm.

However, in modern technologies, synchronous designs' timing constraints are becoming very difficult to meet, as process and on chip variation effects get more aggressive and performance, area and power budgets get tighter. To cope with such problems, there is a slow yet steady movement towards the adoption of non-synchronous techniques and better design space of the asynchronous paradigm. In fact, more and more designs are moving towards architectures with multiple clock islands and in some cases the adoption of fully asynchronous techniques. These techniques remove partially or completely the clock signal, using handshake protocols for control and sequencing of events instead. To do so, there are different approaches available in the state-of-the-art, including Bundled-Data circuits for Intellectual Property (IP) design and Chronos Channels for chip-level global communication.

Bundled-Data circuits comprise single-rail logic and conventional Boolean gates for combinatorial logic and, typically, conventional latch or flip-flop based circuits for sequential logic. This way, they can be implemented using conventional EDA tools and flows. Moreover, timing constraints and global signals distribution can be relaxed, potentially enabling savings in area and power. Yet, such circuits still need to be verified in every corner, as they rely on relative timing constraints for correct operation. Chronos Channels are advantageous because they are robust to Pressure, Volume and Temperature (PVT) variations and present no relative timing constraint. This way they alleviate timing closure of large chips by eliminating the need of verifying all constraints for Chronos Channel logic blocks. Also, they rely on temporal compression to potentially reduce area and power overheads. However, they rely on synchronizers to interface with synchronous IP blocks. Moreover, they rely on quasi-delay-insensitive logic to implement transmitter (TX) and receiver (RX) blocks, which, typically, consumes more area than bundled-data solutions. Chronos Channels are described in the U.S. patent applications incorporated above.

SUMMARY

Apparatuses and methods for ASIC design are provided. According to one aspect, a circuit, comprising a bundled-data circuit with several boundaries; an asynchronous compression circuit at one boundary of the bundled-data circuit, the asynchronous compression circuit comprising transmit circuitry configured to serializes j sets of r bits data into m sets of r bits data to provide a compression ratio equal to j/m; a decompression circuit at boundary, the decompression circuitry comprising receive circuitry configured to de-serialize i sets of k bits data into q sets of k bits data to provide a de-compression ratio equal to q/i.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein can be embodied in a variety of other forms. Furthermore, various omissions, substitutions, and changes in the form of the example methods and systems described herein may be made without departing from the scope of protection.

Figure 8:
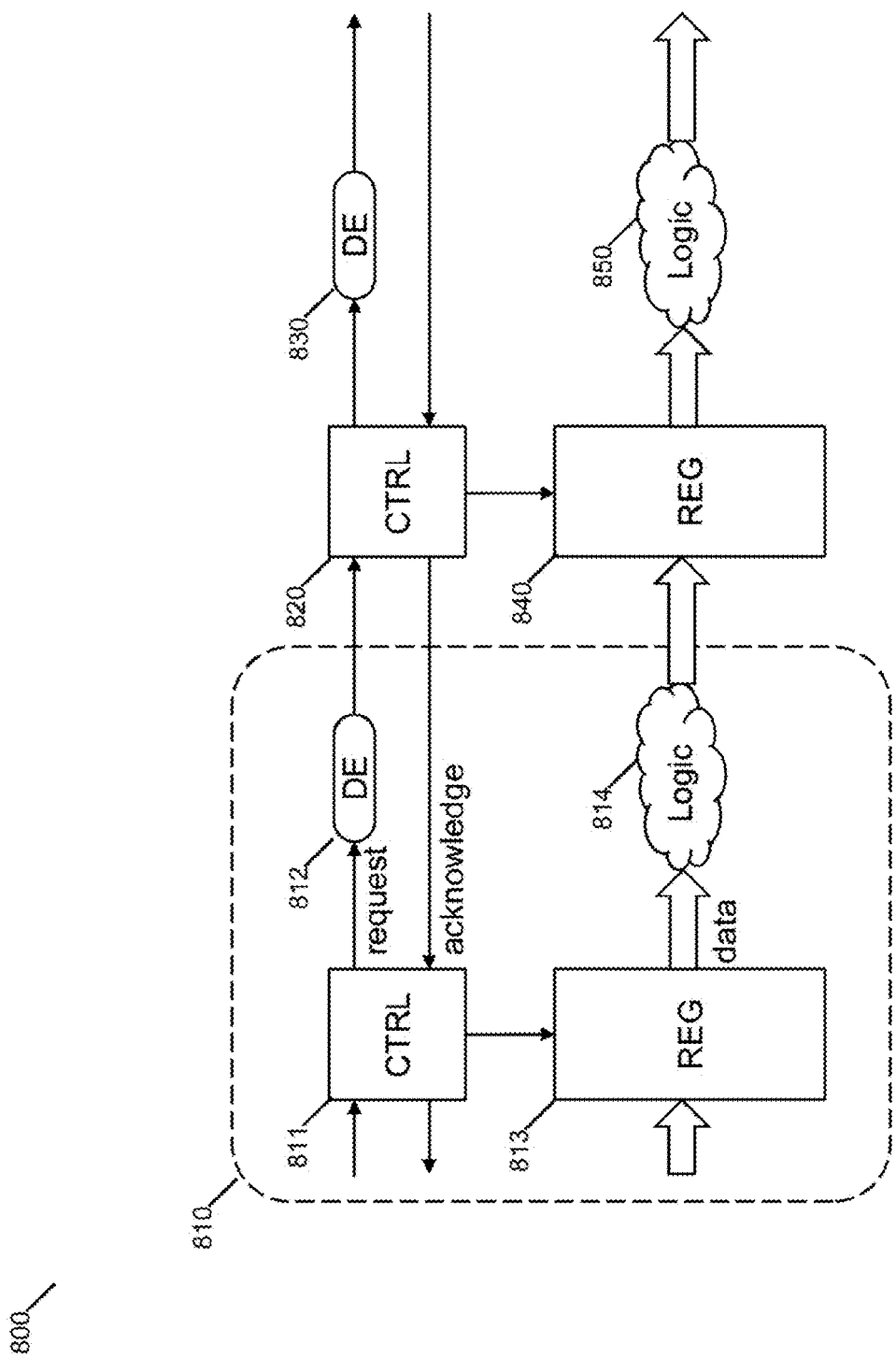
FIG. 8 shows a Bundled-Data architecture specification.

FIG. 8 shows an example of circuit 800 architecture for bundled-data ("BD") templates. These architectures are typically specified as pipeline stages (810) that detail the design of sequential and combinational logic as well as control circuitry. The major differences between different BD architectures are typically on control blocks (CTRL) (811 and 820) and in the employed registers (REG) (813 and 840). Control blocks can be specified as asynchronous finite state machines or as explicit circuit blocks, as in Click [FIG. 5]. Registers can be typical latches or flip-flops or more sophisticated circuits, as the capture-pass latches used in Micropipelines. Logic blocks (814 and 850) between registers are designed using conventional single rail logic and implemented using traditional logic gates. An important aspect of the architectures of BD templates, though, is the relation between the request and acknowledge signals and the data bus. Classically, the request signal identifies the validity of data in the data bus and the acknowledge signal indicates that the data was consumed. For example, after data is stable in the data bus, a request is signaled by switching the logic value of its signal. When the acknowledgement is issued, i.e. after its signal has its logic value switched, a new communication can begin. However, the request must only be sampled after the data in the data bus is stable. Therefore, a delay element ("DE") (812 and 850) are added to the request signal to ensure that it will only reach the next register after all data signals have been computed through the logic block and are stable and valid.

Figure 5:
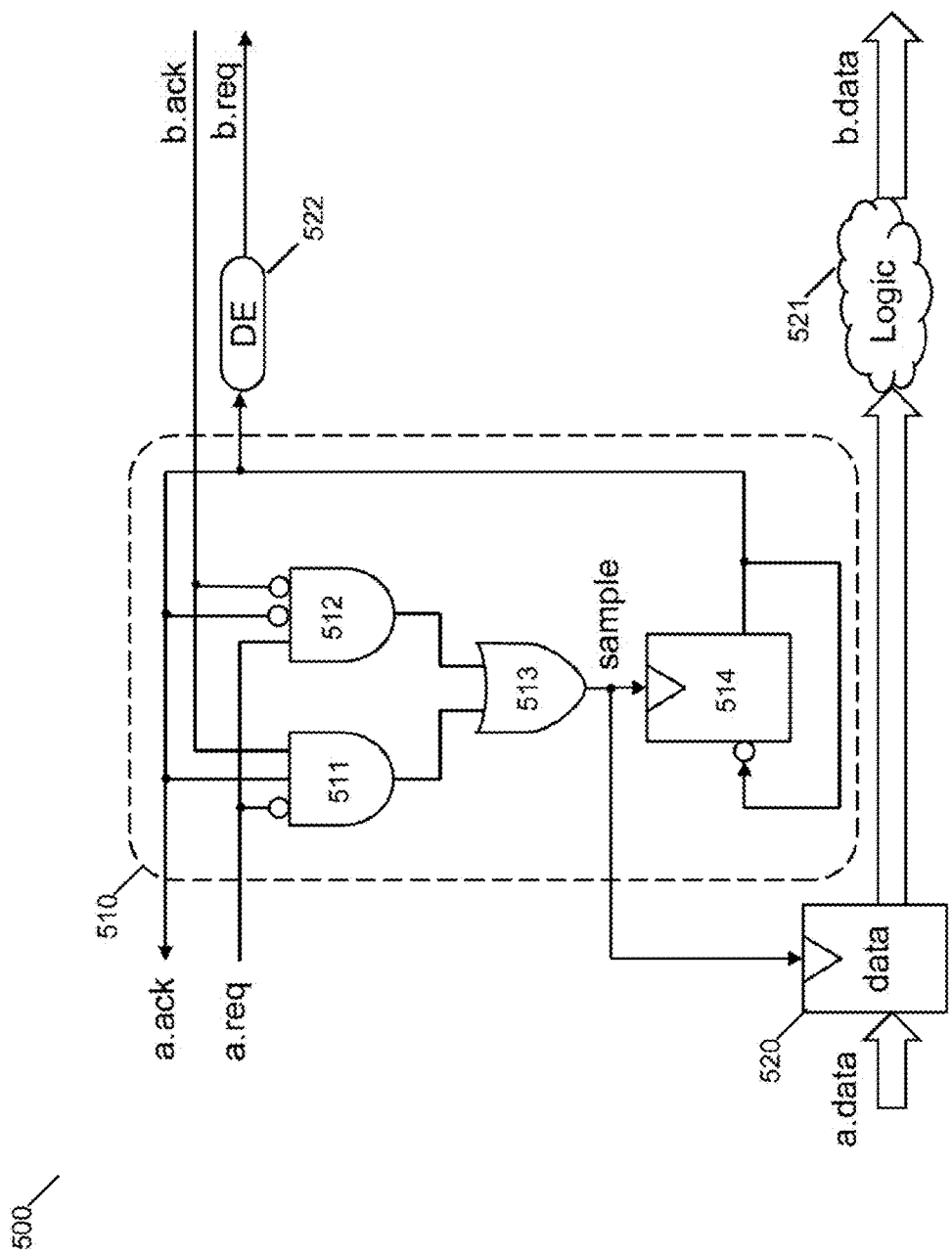
FIG. 5 is a general block diagram illustrating a possible embodiment of a Click pipeline stage.

Click is an example of a BD architecture consisting of flop-based control and data-paths. Such characteristic allow the insertion of conventional scan-chain test structures and good compatibility with conventional EDA tools, while not incurring area and power penalties. FIG. 5 shows the definition of this architecture 500. Accordingly, registers (520) are simply flip-flops, data is represented using traditional Boolean single-rail and logic blocks (521) composed of conventional logic gates. Control blocks (510) are composed by a set of logic gates implementing a sample function such that:

$$\text{sample} = (a.ack \wedge b.ack \wedge \overline{a.req}) \vee (\overline{a.ack} \wedge \overline{b.ack} \wedge a.req)$$

The signal generated from this function, using logic gates (511, 512 and 513), is connected to the clock pins of the flip-flops in the data path (520) and the control block itself (514). This way, the sample signal is responsible for controlling the sampling of data in the data path and the generation of the request and acknowledge signals in the control block. For example, assuming an initial state where all control signals are at 0, as soon as "a.req" switches to 1, indicating the availability of new data, sample will switch to 1, sampling the flip-flops in the data path (and capturing the valid data). At the same time, it activates the flop in the controller, generating a request to the next pipeline stage, by switching to 1 "b.req", and acknowledging the sampled data from the previous stage, by switching "a.ack" to 1. During this process, it also switches the "sample" signal back to 0. As soon as the circuit receives an acknowledgement from the next stage ("b.ack" switches to 1) and a request from the previous stage ("a.req" switches to 0), "sample" will switch to 1 again, sampling the data in the data path and restarting the process. Note that, to allow such functionality, a relative timing constraint must be guaranteed, such that:

$$t_{datapath} \leq t_{ctrlpath}$$

where $t_{datapath}$ is the delay from the gate that generates sample (513), through the datapath registers (520) and the logic block (521), to "b.data" and $t_{ctrlpath}$ is the delay from the gate that generates sample (513), through the control block flip-flop (514) and the DE (522), to "b.req". To guarantee such constraint, the delay of DE can be tuned for each circuit using delay element circuits.

Chronos Light circuits employ BD architectures to implement specific functionalities. Moreover, to minimize congestion and simplify routing Chronos Light adds temporal compression to transport information, which can be implemented with different design styles, including BD or synchronous circuits. The temporal compression ratio determines the number of slots in which a cycle time will be divided. This allows distributing temporally the data to be transmitted and reducing hardware overhead because the different slots can be propagated by sequentially using the same hardware. In other words, the temporal compression ratio defines in how many pieces the data will be split in order to be serially transmitted through a channel. This compression ratio can be defined as any positive rational number and is only constrained by the maximum frequency allowed by a target technology. For example, assuming a cycle time if 1 ns, a compression ratio of 2 means that the data to be transmitted will be split in two pieces of data, each with a 0.5 ns slot of the total cycle time. In this way, the circuit implemented in Chronos Light needs to guarantee that each piece of data can be transmitted in 0.5 ns, to ensure a 1 ns cycle time. Note that, for higher temporal compression ratios, this number is reduced, in such a way that the maximum ratio possible is limited by the maximum speed allowed by the target technology (or the minimum delay for a single slot).

Figure 6:
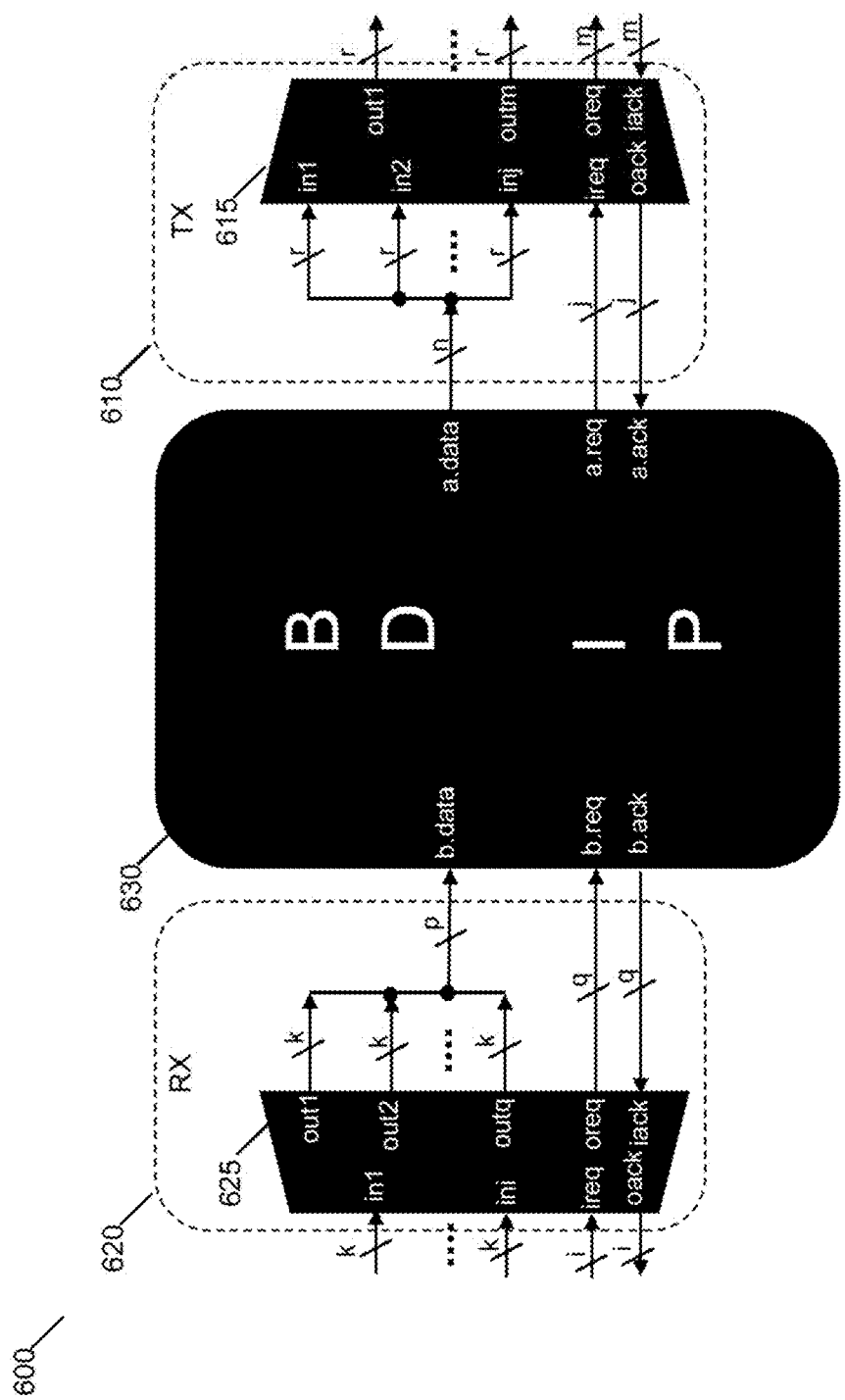
FIG. 6 details a Chronos Light block.

To implement Chronos Light in a target technology, different circuits can be employed. FIG. 6 shows a block diagram with the general hardware organization, in various embodiments, to explore the functionality of these circuits. Chronos Light (600) is the combination of Bundled-Data circuit IP (630) with asynchronous compression (610) and decompression (620) at the boundary. Note that as a special case, Chronos Light (600) can be applied using a synchronous circuit IP in place of the BD circuit IP, using converters to interface with the asynchronous compression and decompression blocks. Asynchronous compression and decompression blocks are also called TX and RX blocks, respectively, as they implement the interfaces of Chronos Light circuitry. In the case of a TX (610), the data reaches the time compressor (615) which serializes the j sets of r bits data, into m sets of r bits data. Following this notation, the compression ratio would be RATIO=j/m. Note that each set of r wires can have its separate set of request (req) and acknowledge (ack) signals, connected to the ireq, oreq, oack and iack in FIG. 6 (615). Also, as a special case, all sets may share a single set of request and acknowledge signals, to reduce routing and logic overheads. In the case of the RX (620), the data reaches the time decompressor (625), which de-serialize the i sets of k bits data into q sets of k bits data. Following this notation, the de-compression ratio would be RATIO=q/i.

Figure 7:
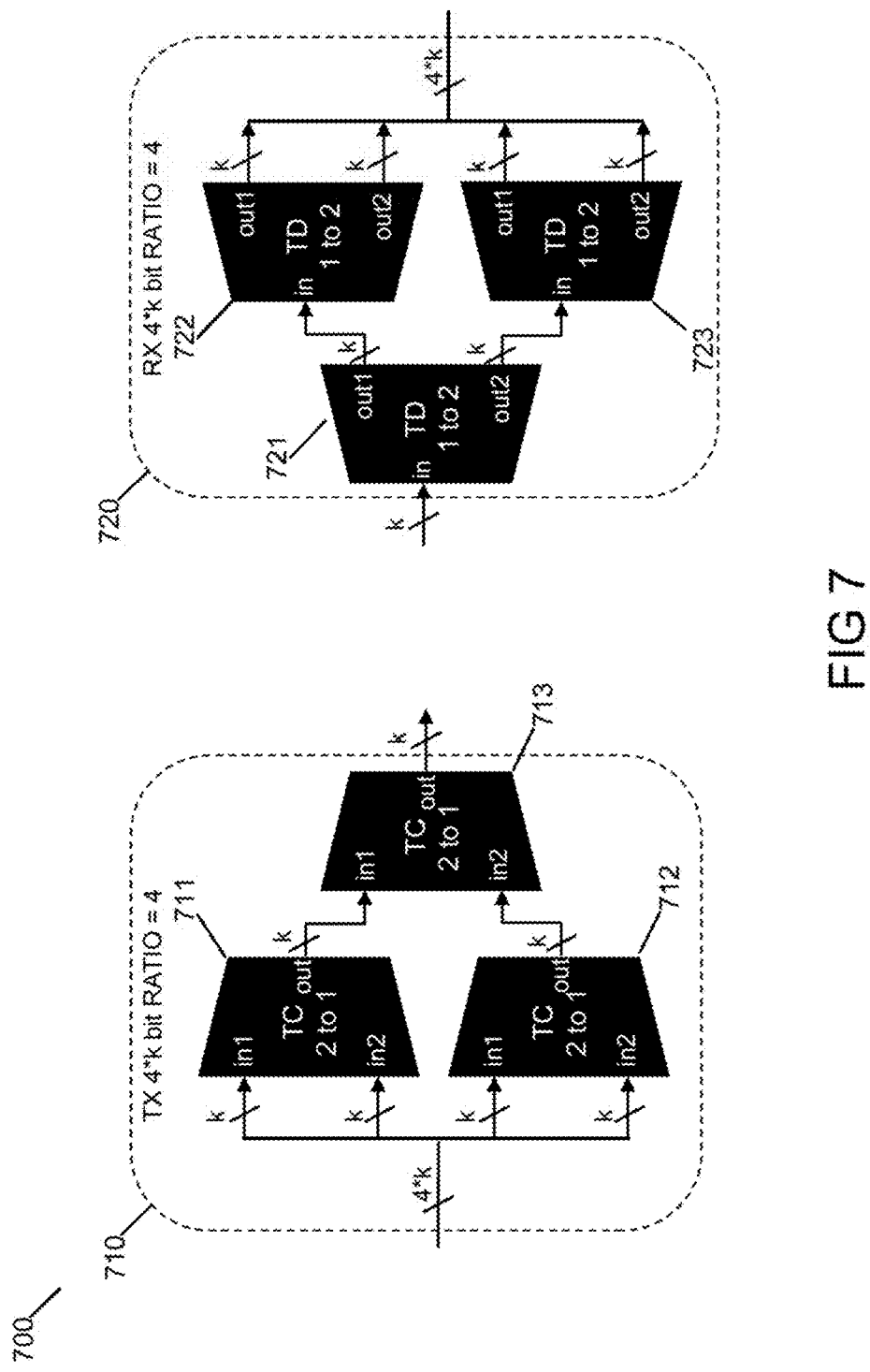
FIG. 7 illustrated and example of RX and TX implementations in a Chronos Light block.

FIG. 7 shows the details of a possible implementation (700) for a Chronos Light TX (710) and a Chronos Light RX (720) when the compression ratio is RATIO=4. In this example, the TX (710) and RX (720) have the same throughput, requiring the same temporal compression ratio (in this case 4). Also, this example shows how temporal compressors and decompressors can be arranged in tree structures, as they are associative. Note that, for simplicity, the request and acknowledge signals were omitted in this figure. In the TX block (710), the bus is broken down into k bit sections which are connected to the 2-to-1 temporal compressors (711) and (712). The latter are then connected to another temporal compressor (713). In the RX (720), the temporal decompressors are organized in a tree structure where a single 1-to-2 temporal decompressor (721) has its outputs connected to two other temporal decompressors (722) and (723). These temporal decompressors, in turn, are connected to Bundled-Data logic.

Figure 1:
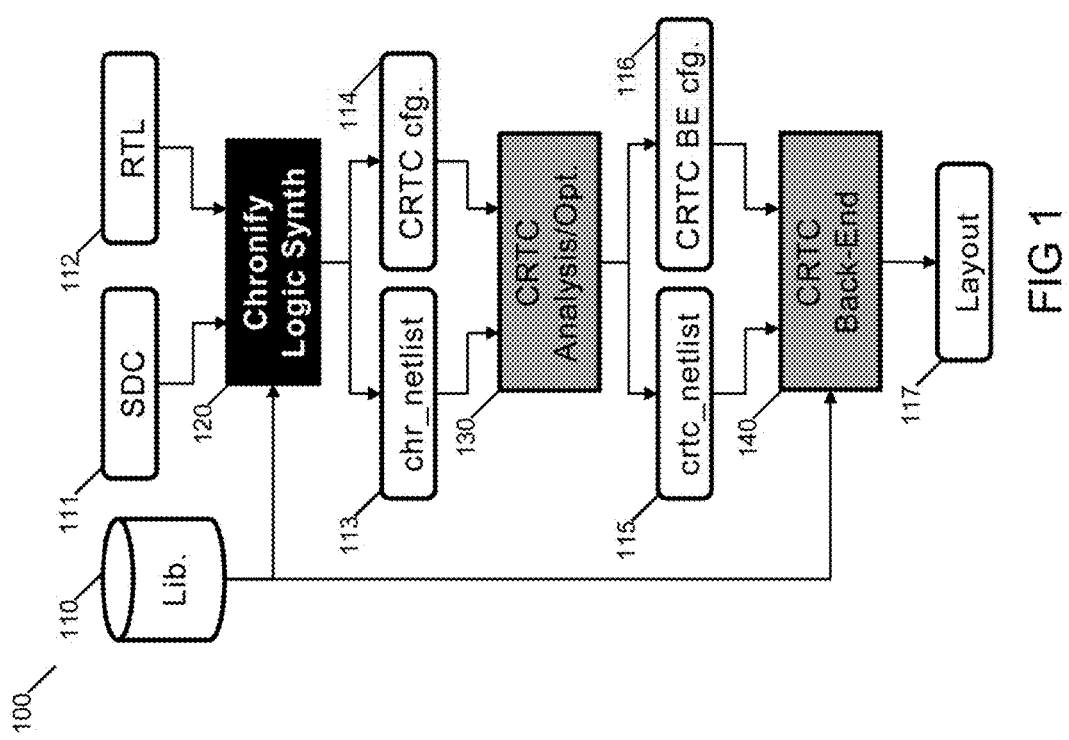
FIG. 1 is a flowchart illustrating the RTL2CHR design flow according to various embodiments.

All circuits that compose a Chronos Light block can be implemented using the Chronos RTL2CHR flow, detailed in FIG. 1 (100). The flow (100) receives the cell library model files (110), RTL design files (112) and design constraints (111) as inputs, and produces the final layout (117) as output. The flow is broken down into three separate steps: Chronify logic synthesis (120), Chronos relative timing constraints analysis and optimization (130) and Chronos relative timing constraint back-end (140).

Figure 2:
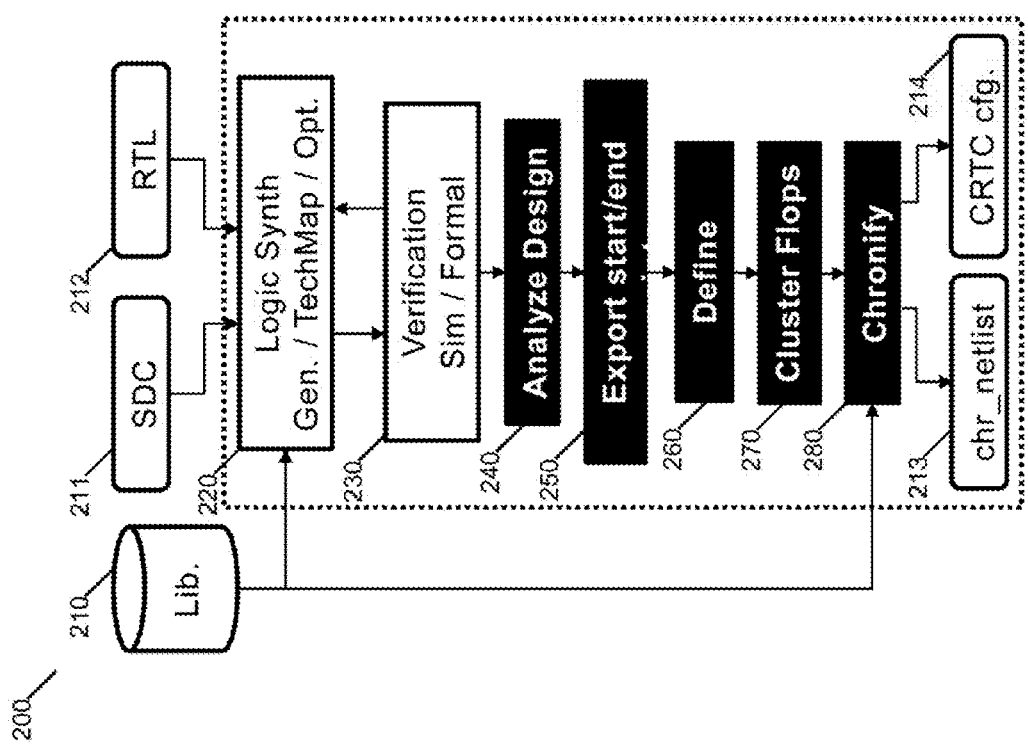
FIG. 2 is a flowchart illustrating the Chronify logic synthesis portion of the RFTL2CHR flow according to various embodiments.

FIG. 2 shows the details of a first step (200). This portion of the flow has the purpose of synthesizing the source RTL (212) to a specific targeted technology and translate it to a Chronos Light netlist (213). To do so it is divided in the following sub-steps:

1. Logic synthesis (220): Conventional synchronous synthesis flow to generate a mapped netlist.
2. Verification (230): Conventional post synthesis verification flow to ensure correctness of the generated netlist. Verification can rely either on formal methods or simulation, or both.
3. Analyze design (240): Reads the synthesized netlist and analyzes it, extracting all sequential components and primary input and output ports.
4. Export start/end points (250): Exports all valid timing start and end points to enable isolating sequential components.
5. Define groups (260): Enables the grouping of sequential components and input and output ports.
6. Cluster (270): Clusters sequential components into groups.
7. Chronify (280): Inserts Chronos light controllers to the netlist and connects them to sequential component clusters. This step also resolves special logic blocks that may be required to deal with control or data flow, including and not limited to arbitration, steering, merging and serializing/deserializing. The result is a Chronos light netlist (213) and a set of configuration files (214) to be used in the next steps of RTL2CHR.

Figure 3:
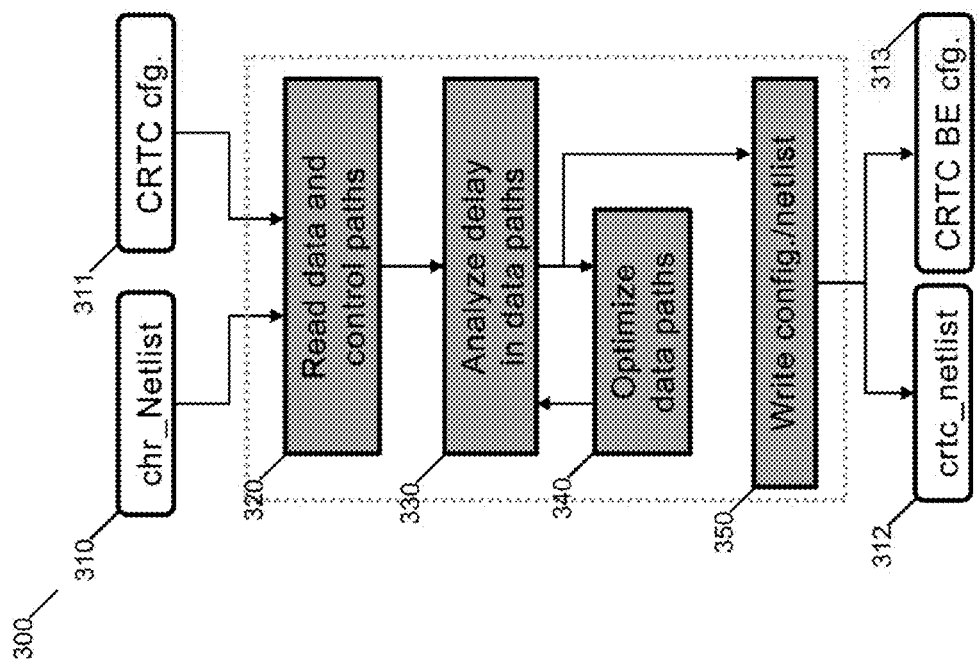
FIG. 3 is a flowchart showing the CRTC analysis and optimization portion of the RTL2CHR flow according to various embodiments.

FIG. 3 shows the details of the second step, CRTC Optimization and Analysis (300). This step reads a Chronos light netlist (310) and a set of configuration files (311) to run the Chronos Relative Timing Constraints (CRTC) analysis and optimization. It is divided in the following sub-steps:

1. Read data and control paths (320): Divides the circuit in data and control paths as defined in the configuration file.
2. Analyze delay in data paths (330): Computes the delay of all the isolated data paths.
3. Optimize data paths (340): This is an optional step where the computed delay of all isolated data paths is compared to the specifications and constraints originally defined by the user, available in the configuration file. If the data paths do not meet the defined constraints, the circuit is optimized using conventional synthesis frameworks.
4. Write configurations and netlist (350): This step defines the required relative timing constraints for the implementation of the circuit. First, it reads the defined delay of data paths and computes the relative delay that should be ensured in control paths. It then exports the netlist (312) and writes the computed values for control path delays in a configuration file, together with required configurations (313) for the next step of RTL2CHR.

Figure 4:
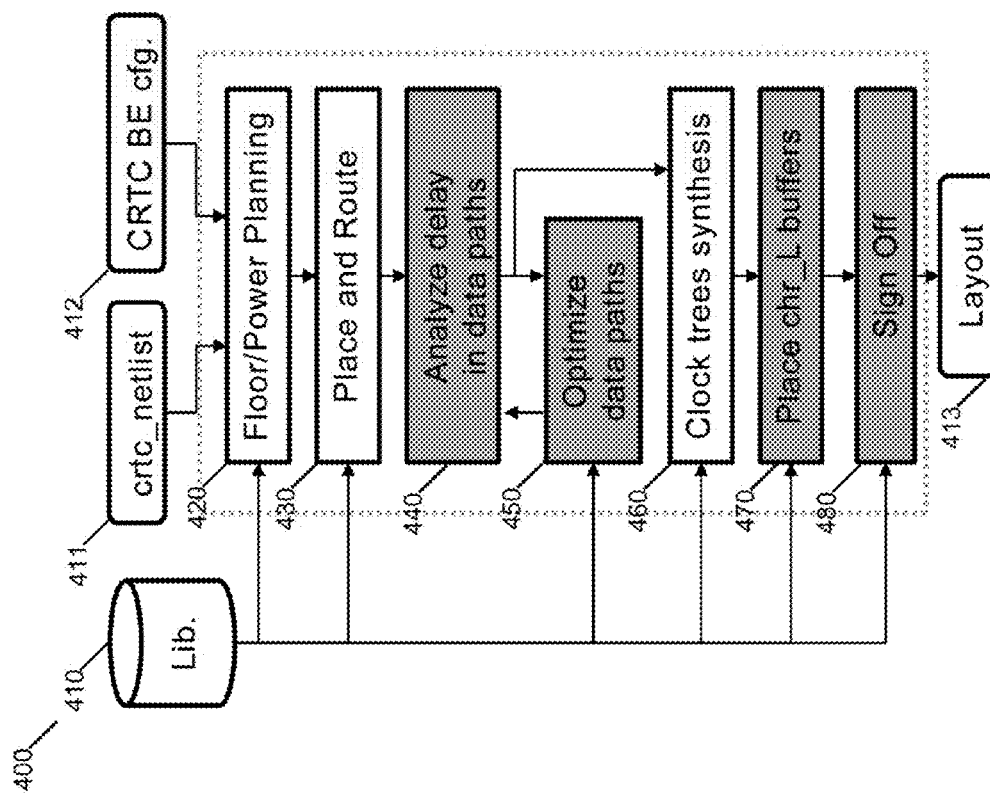
FIG. 4 represents a flowchart of the CRTC back-end point portion of the RTL2CHR flow according to various embodiments.

FIG. 4 shows the details of final CRTC Back-End step (400): This step reads a netlist (411) and a set of configuration files (412) to run the back-end portion of the CRTC flow. It will generate a layout (413) for a target technology after the following steps:

1. Floor/Power Planning (420): These steps can be the same as those in conventional back-end flows.
2. Place and Route (430): These steps can be the same as those in conventional back-end flows.
3. Analyze delay in data paths (440): Computes the delay of all isolated data paths of the placed and routed design, as defined in the configuration file.
4. Optimize data paths (450): This optional step allows the optimization of placed and routed data paths if they do not meet the defined constraints in the configuration file. Optimization is performed using conventional back-end tools.
5. Clock trees synthesis (460): Synthesizes clock trees for clusters of flops. This step relies on conventional back-end tools.
6. Place Chronos Light buffers (470): Reads the configuration file and places Chronos buffers to fulfill the defined relative timing constraints between data and control paths.
7. Verification and Signoff (480): In this step, the designer can verify the generated circuit, i.e. using formal methods or simulation, and perform signoff tasks. On top of conventional signoff tasks, the designer must ensure that the design is timing constraints clean.

Figure 9:
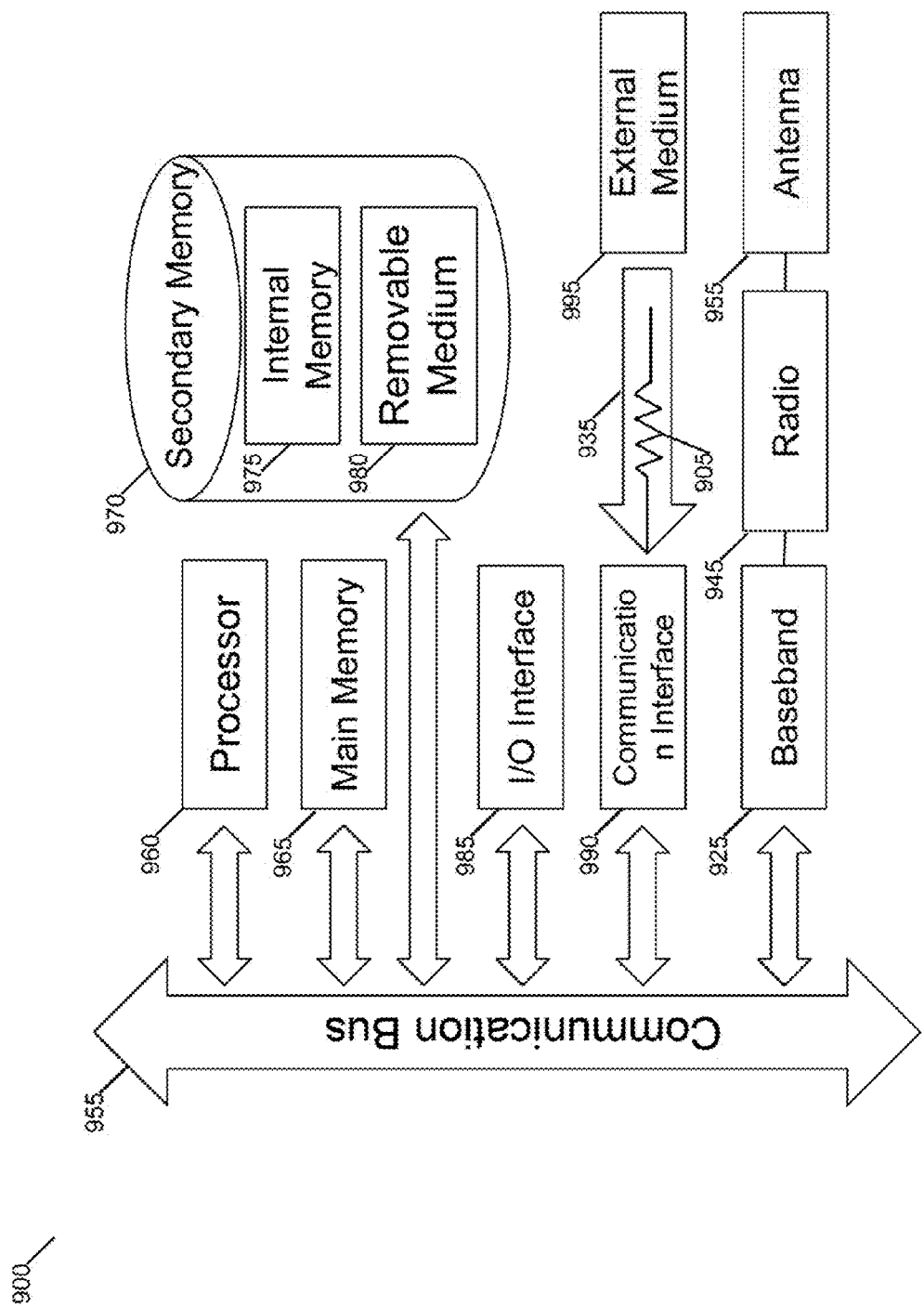
FIG. 9 represents a wired or wireless system

FIG. 9 is a block diagram illustrating a wired or wireless system 900 according to various embodiments that may utilize the systems and methods described above in reference to the other Figures. For example, the system 900 could be utilized to perform the process illustrated above to generate the blocks described above. In various embodiments, the system 900 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 900 preferably includes one or more processors, such as processor 760. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 960.

The processor 960 is preferably connected to a communication bus 955. The communication bus 955 may include a data channel for facilitating information transfer between storage and other peripheral components of the system 900. The communication bus 955 further may provide a set of signals used for communication with the processor 960, including a data bus, address bus, and control bus (not shown). The communication bus 955 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 900 preferably includes a main memory 965 and may also include a secondary memory 970. The main memory 965 provides storage of instructions and data for programs executing on the processor 960. The main memory 965 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 970 may optionally include an internal memory 975 and/or a removable medium 980, for example a floppy disk drive, a magnetic tape drive, a compact disc ("CD") drive, a digital versatile disc ("DVD") drive, etc. The removable medium 980 is read from and/or written to in a well-known manner. Removable medium 980 may be, for example, a floppy disk, magnetic tape, CD, DVD, SD card, etc.

The removable medium 980 is a non-transitory computer readable medium having stored thereon computer executable code (i.e., software) and/or data. The computer software or data stored on the removable medium 980 is read into the system 900 for execution by the processor 960.

In alternative embodiments, secondary memory 970 may include other similar means for allowing computer programs or other data or instructions to be loaded into the system 900. Such means may include, for example, an external medium 995 and a communication interface 990. Examples of external medium 995 may include an external hard disk drive or an external optical drive, or and external magneto-optical drive.

Other examples of secondary memory 970 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 980 and a communication interface 990, which allow software and data to be transferred from an external medium 995 to the system 900.

The system 900 may also include an input/output ("I/O") interface 985. The I/O interface 985 facilitates input from and output to external devices. For example the I/O interface 985 may receive input from a keyboard or mouse and may provide output to a display. The I/O interface 985 is capable of facilitating input from and output to various alternative types of human interface and machine interface devices alike.

The communication interface 990 allows software and data to be transferred between system 900 and external devices (e.g. printers), networks, or information sources. For example, computer software or executable code may be transferred to system 900 from a network server via communication interface 990. Examples of communication interface 990 include, for example, but not limited to, a modem, a network interface card ("NIC"), a wireless data card, a communications port, a PCMCIA slot and card, an infrared interface, and an IEEE 1394 fire-wire.

The communication interface 990 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 990 are generally in the form of electrical communication signals 905. In one exemplary embodiment, these electrical communication signals 905 are provided to the communication interface 990 via a communication channel 935. In one embodiment, the communication channel 935 may be a wired or wireless network, or any variety of other communication links. The communication channel 935 carries the electrical communication signals 905 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 965 and/or the secondary memory 970. Computer programs can also be received via communication interface 990 and stored in the main memory 965 and/or the secondary memory 970. Such computer programs, when executed, enable the system 900 to perform the various functions of the present invention as previously described.

In this description, the term "computer readable medium" is used to refer to any non-transitory computer readable storage media used to provide computer executable code (e.g., software and computer programs) to the system 900. Examples of these media include the main memory 965, the secondary memory 970 (including the internal memory 975, the removable medium 980, and the external medium 995), and any peripheral device communicatively coupled with the communication interface 990 (including a network information server or other network device). These non-transitory computer readable mediums are means for providing executable code, programming instructions, and software to the system 900.

In one embodiment implemented using software, the software may be stored on a computer readable medium and loaded into the system 900 by way of the removable medium 980, the I/O interface 985, or the communication interface 990. In such an embodiment, the software is loaded into the system 900 in the form of electrical communication signals 905. The software, when executed by the processor 960, preferably causes the processor 960 to perform the inventive features and functions previously described herein.

The system 900 also includes optional wireless communication components that facilitate wireless communication over a voice and over a data network. The wireless communication components comprise an antenna system 955, a radio system 945 and a baseband system 925. In the system 900, radio frequency ("RF") signals are transmitted and received over the air by the antenna system 955 under the management of the radio system 945.

In one embodiment, the antenna system 955 may comprise one or more antennae and one or more multiplexors (not shown) that perform a switching function to provide the antenna system 955 with transmit and receive signal paths. In the receive path, received RF signals can be coupled from a multiplexor to a low noise amplifier (not shown) that amplifies the received RF signal and sends the amplified signal to the radio system 945.

In alternative embodiments, the radio system 645 may comprise one or more radios that are configured to communicate over various frequencies. In one embodiment, the radio system 945 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 945 to the baseband system 925.

If the received signal contains audio information, then baseband system 925 decodes the signal and converts it to an analog signal. Then the signal is amplified and sent to a speaker. The baseband system 925 may also receive analog audio signals from a microphone. These analog audio signals are converted to digital signals and encoded by the baseband system 925. The baseband system 925 also codes the digital signals for transmission and generates a baseband transmit audio signal that is routed to the modulator portion of the radio system 945. The modulator mixes the baseband transmit audio signal with an RF carrier signal generating an RF transmit signal that is routed to the antenna system 955 and may pass through a power amplifier (not shown). The power amplifier amplifies the RF transmit signal and routes it to the antenna system 955 where the signal is switched to the antenna port for transmission.

The baseband system 925 may also be communicatively coupled with the processor 960. The processor 960 has access to main memory 965 and/or secondary memory 970. The processor 960 is preferably configured to execute instructions (i.e., computer programs or software) that can be stored in the main memory 965 or the secondary memory 970. Computer programs can also be received from the baseband system 925 and stored in the main memory 965 or in secondary memory 970, or executed upon receipt. Such computer programs, when executed, enable the system 900 to perform the various functions of the present invention as previously described. For example, the main memory 965 may include various software modules (not shown) that are executable by processor 960. The accompanying claims and their equivalents are intended to cover such forms or modifications as would fall within the scope and spirit of the protection. For example, the example apparatuses, methods, and systems disclosed herein can be applied to wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for designing an application specific integrated circuit (ASIC) by converting RTL code and constraints into an optimized physical circuit implementation of the ASIC, comprising:
   using at least one processor coupled to a memory:
      receiving, from the memory, cell library model files, RTL design files and design constraints as inputs;
      performing logic synthesis based on the inputs to produce logic synthesis outputs, said performing logic synthesis comprises:
         generating a mapped netlist from the inputs, the netlist comprising a sequential components and input and output ports,
         clustering sequential components into a plurality of clusters, each cluster comprising one or more sequential components, an input port, and an output port,
         inserting controllers into the generated netlist and connecting at least one controller to each of the plurality of clusters at either the input or output port, and
         outputting at least a converted netlist;
      performing timing constraint analysis and optimization on the logic synthesis outputs, including the converted netlist, to produce timing constrained outputs;
      performing relative timing constraint back-end analysis to produce the final layout output of the ASIC; and
      fabricating the physical circuit implementation of the ASIC using the produced final layout output.

2. The method of claim 1, wherein logic synthesis comprises:
   performing logic synthesis that comprises a synchronous synthesis flow to generate the mapped netlist;
   performing post synthesis verification flow to ensure correctness of the generated mapped netlist;
   analyzing the design by reading the synthesized mapped netlist and extracting all the sequential components and input and output ports;
   exporting all valid timing start and end points to isolate the sequential components;
   defining groups of the sequential components and input and output ports;
   clustering the sequential components into the plurality of clusters based on the defined groups;
   inserting the controllers into the synthesized mapped netlist and connecting the at least one controller to each of the plurality of clusters at either the input or output port and
   outputting the converted netlist and a set of configuration files.

3. The method of claim 2, further comprising resolving special logic blocks required to deal with control or data flow.

4. The method of claim 1, wherein performing timing constraint analysis and optimization further comprises:
   dividing the physical circuit implementation of the ASIC into data and control paths as defined in a set of configuration files to identify isolated data and control paths, wherein the produced logic synthesis outputs comprises the set of configuration files;
   computing a delay of all the isolated data paths;
   comparing the computed delay of all the isolated data paths with specifications and constraints originally defined by a user in the set of configuration files;
   when it is determined that the computed delay of all the isolated data paths do not meet the defined design constraints, then optimizing the physical circuit implementation of the ASIC using synthesis frameworks;
   reading the computed delay of all data paths and computing a relative delay based on design requirements for the control paths as included in the RTL design files or design constraints; and
   exporting a netlist and writing the computed relative delay for the control path in a resulting configuration file.

5. The method of claim 1, wherein performing relative timing constraint back-end analysis further comprises:
   performing floor and power planning;
   performing placing and routing;
   computing a delay of all isolated data paths of a placed and routed design, as defined in a configuration filet, comprised in the produced timing constrained outputs;
   optimizing the placed and routed data paths if they do not meet defined constraints in the configuration file;
   synthesizing clock trees for clusters of flops; and
   reading the configuration file and placing buffers to fulfill defined relative timing constraints between data and control paths, and verifying the generated circuit.

* * * * *